US008742641B2

(12) United States Patent
Kubes et al.

(10) Patent No.: US 8,742,641 B2
(45) Date of Patent: Jun. 3, 2014

(54) CONCENTRIC MOTOR POWER GENERATION AND DRIVE SYSTEM

(75) Inventors: Larry Kubes, Indianapolis, IN (US); David Fulton, Anderson, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 315 days.

(21) Appl. No.: 12/953,033

(22) Filed: Nov. 23, 2010

(65) Prior Publication Data
US 2012/0126650 A1   May 24, 2012

(51) Int. Cl.
*H02K 47/00* (2006.01)
*H02K 47/04* (2006.01)
*H02K 47/14* (2006.01)
*H02K 47/20* (2006.01)

(52) U.S. Cl.
CPC ............... *H02K 47/04* (2013.01); *H02K 47/14* (2013.01); *H02K 47/20* (2013.01); *H02K 47/00* (2013.01)
USPC ........ 310/113; 310/102 R; 310/112; 310/114; 318/139

(58) Field of Classification Search
CPC ....... H02K 47/00; H02K 47/04; H02K 47/14; H02K 47/20
USPC ............... 310/102 R, 112, 113, 114; 318/139
IPC ....................................... H02K 47/04
See application file for complete search history.

(56) References Cited

U.S. PATENT DOCUMENTS

| 1,515,321 | A | * | 11/1924 | Hall et al. ................. 475/152 |
| 5,508,574 | A | * | 4/1996 | Vlock ........................ 310/113 |
| 5,914,575 | A | * | 6/1999 | Sasaki ........................ 318/150 |
| 6,768,237 | B1 | * | 7/2004 | Schroedl .................... 310/114 |
| 6,936,933 | B2 | | 8/2005 | Wilmore |
| 7,030,528 | B2 | | 4/2006 | Morgante |
| 7,034,422 | B2 | | 4/2006 | Ramu |
| RE39,205 | E | * | 7/2006 | Sasaki ........................ 318/150 |
| 7,223,201 | B2 | * | 5/2007 | Colvin et al. .................. 477/5 |
| 7,230,363 | B2 | * | 6/2007 | Stout et al. .................. 310/266 |
| 7,242,105 | B2 | | 7/2007 | Mehl |
| 7,259,493 | B2 | | 8/2007 | Oshidari et al. |

(Continued)

FOREIGN PATENT DOCUMENTS

DE   102007001828 A1   7/2008
DE   102007025550 A1   12/2008

(Continued)

OTHER PUBLICATIONS

EP Search Report dated Jul. 23, 2012 for corresponding Application No. 11189670.0; 7 pages.

Primary Examiner — John K Kim
(74) Attorney, Agent, or Firm — Cantor Colburn LLP

(57) ABSTRACT

An apparatus is provided and includes a hub, including first and second opposing faces, a first sidewall fixed at opposite ends thereof to the first and second opposing faces to define a first interior between the first and second opposing faces and a second sidewall fixed to one of the first and second opposing faces to define a second interior within the first interior, a first assembly, disposed within the second interior, to generate current from input mechanical energy and a second assembly, electrically coupled to the first assembly and disposed within the first interior, to generate mechanical energy from current associated with the current generated by the first assembly.

20 Claims, 3 Drawing Sheets

(56) References Cited

U.S. PATENT DOCUMENTS

| | | |
|---|---|---|
| 7,262,536 B2 | 8/2007 | Rahman et al. |
| 7,325,637 B2 | 2/2008 | Sadarangani |
| 7,402,923 B2 | 7/2008 | Klemen et al. |
| 7,591,748 B2 | 9/2009 | Holmes |
| 7,800,276 B2 | 9/2010 | Purvines |
| 8,207,644 B2 * | 6/2012 | Himmelmann ............... 310/112 |
| 2004/0155554 A1 | 8/2004 | Morgante |
| 2008/0023237 A1 | 1/2008 | Houle |
| 2008/0197730 A1 | 8/2008 | Himmelmann et al. |
| 2009/0033255 A1 * | 2/2009 | John et al. ..................... 318/139 |
| 2009/0250280 A1 | 10/2009 | Abe et al. |
| 2010/0025128 A1 * | 2/2010 | Abe et al. ................. 180/65.25 |
| 2010/0071974 A1 | 3/2010 | Akutsu et al. |
| 2010/0207471 A1 | 8/2010 | Hendrickson et al. |
| 2011/0012447 A1 * | 1/2011 | Himmelmann ................. 310/54 |
| 2012/0126650 A1 * | 5/2012 | Kubes et al. .................. 310/113 |

FOREIGN PATENT DOCUMENTS

| | | |
|---|---|---|
| EP | 2072320 A1 | 6/2009 |
| FR | 2811267 A1 | 1/2002 |
| FR | 2865867 A1 | 8/2005 |
| WO | 9921263 A2 | 4/1999 |
| WO | 9939426 A1 | 8/1999 |
| WO | 0101550 A1 | 1/2001 |

* cited by examiner

CONCENTRIC MOTOR POWER GENERATION AND DRIVE SYSTEM

BACKGROUND OF THE INVENTION

The subject matter disclosed herein relates to a concentric motor power generation and drive system.

In many vehicles and, in particular, hybrid vehicles, power transmission systems are used for converting mechanical energy generated in an engine into electrical energy that can either be stored or converted back to mechanical energy that can be employed for driving purposes. These power transmission systems often include a generator rotor, which is driven to rotate by a drive shaft that is rotatably coupled to an engine, and a generator stator, which converts the rotor rotation into electrical energy. This electrical energy is either stored by a battery or transmitted to a drive stator, which induces rotation of a drive rotor that is, in turn, coupled to, for example, vehicle wheels.

Typically, in conventional power transmission systems, the generator elements and the drive elements are not mounted together and may be, in fact, disposed at different parts of a particular vehicle. Thus, there is a need to separately mount these features in such a vehicle in relatively heavy and complex arrangements. This leads to the vehicle itself being relatively heavy and less fuel economical than it otherwise could be.

BRIEF DESCRIPTION OF THE INVENTION

According to one aspect of the invention, an apparatus is provided and includes a hub, having first and second opposing faces, a first sidewall fixed at opposite ends thereof to the first and second opposing faces to define a first interior between the first and second opposing faces and a second sidewall fixed to one of the first and second opposing faces to define a second interior within the first interior, a first assembly, disposed within the second interior, to generate current from input mechanical energy and a second assembly, electrically coupled to the first assembly and disposed within the first interior, to generate mechanical energy from current associated with the current generated by the first assembly.

According to another aspect of the invention, an apparatus is provided and includes a hub, having first and second opposing faces, a first sidewall fixed at opposite ends thereof to the first and second opposing faces to define a first interior between the first and second opposing faces and a second sidewall fixed to one of the first and second opposing faces to define a second interior within the first interior, a first assembly, disposed within the second interior, to generate current from input mechanical energy, a second assembly, electrically coupled to the first assembly and disposed within the first interior, to generate mechanical energy from current associated with the current generated by the first assembly and an energy capture circuit, electrically interposed between the first and second assemblies, to capture electrical energy from the generated current.

According to yet another aspect of the invention, an apparatus is provided and includes a hub, having first and second opposing faces, a first sidewall fixed at opposite ends thereof to the first and second opposing faces to define a first interior between the first and second opposing faces and a second sidewall fixed to one of the first and second opposing faces to define a second interior within the first interior, a first assembly, disposed within the second interior, to generate current from input mechanical energy, a second assembly, electrically coupled to the first assembly and disposed within the first interior, to generate mechanical energy from current associated with the current generated by the first assembly and a coupling to mechanically couple the first and second assemblies such that the input mechanical energy is transferred from the first assembly to the second assembly.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
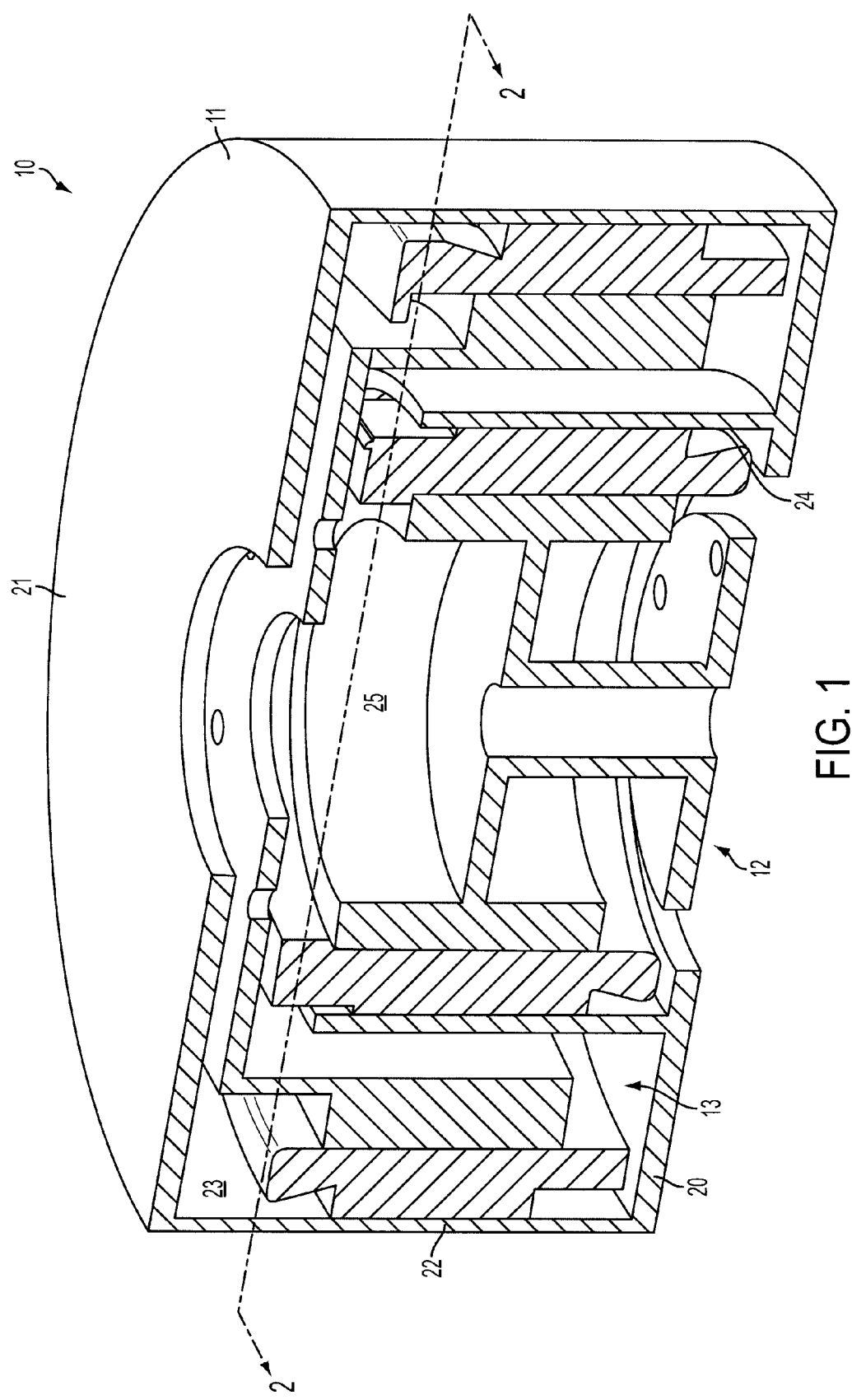
FIG. 1 is a perspective view of a concentric motor power generation and drive system apparatus.
Figure 2:
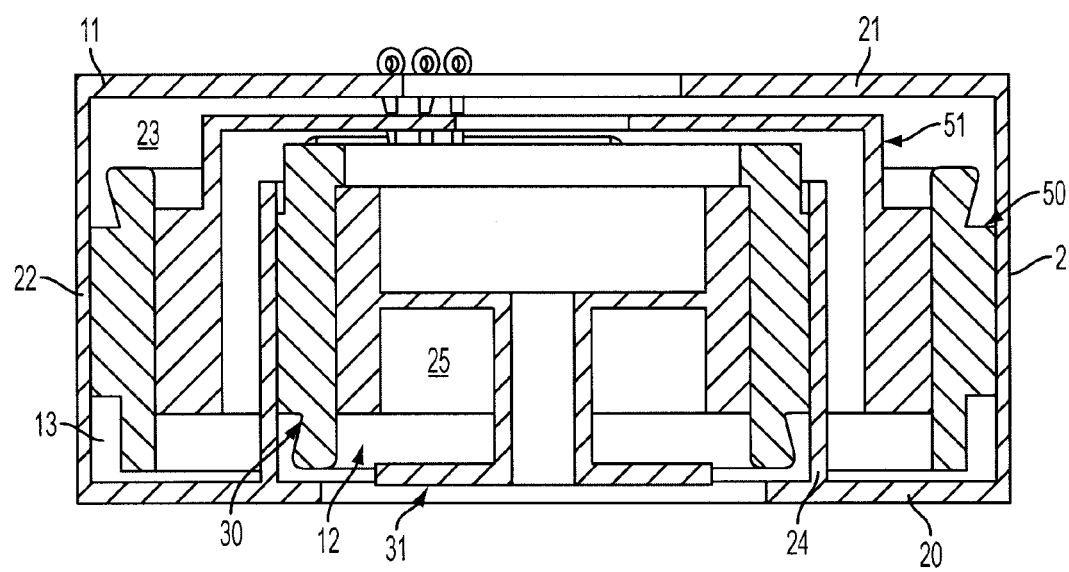
FIG. 2 is a view of the concentric motor power generation and drive system apparatus taken along lines 2-2 of FIG. 1.
Figure 3:
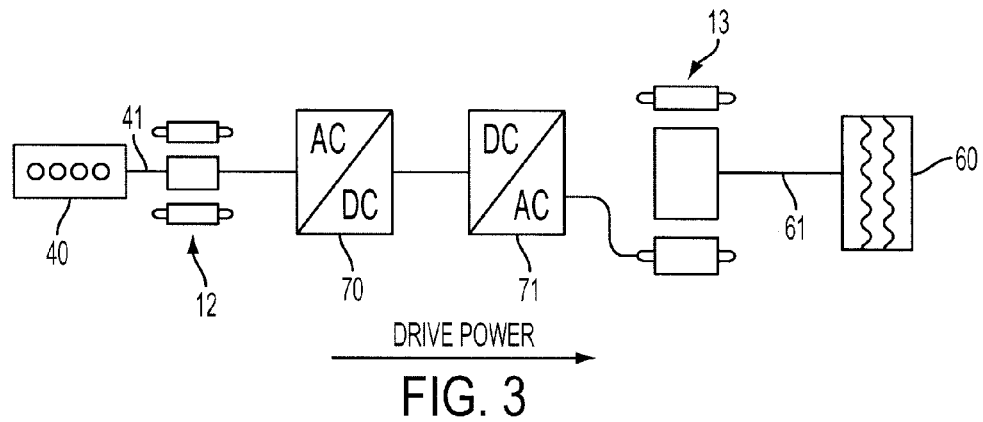
FIG. 3 is a schematic circuit diagram of the concentric motor power generation and drive system apparatus.

With reference to FIGS. 1-3, a concentric motor power generation and drive system apparatus 10 is provided. The apparatus 10 includes a hub 11, a first assembly 12 and a second assembly 13. The hub 10 includes first and second opposing faces 20, 21, a first sidewall 22 fixed at opposite ends thereof to the first and second opposing faces 20, 21 to define a first interior 23 between the first and second opposing faces 20, 21 and a second sidewall 24. The second sidewall 24 is fixed to one of the first and second opposing faces 20, 21 to define a second interior 25 within the first interior 23. The hub 10 may therefore be a housing and may be rigidly affixed to an engine, a drive power generation device or some similar type of mounting.

The first assembly 12 is disposed within the second interior 25 and is configured to generate electrical current from input mechanical energy. By contrast, the second assembly 13, which is electrically coupled to the first assembly 12, is disposed within the first interior 23 generally surrounding the second sidewall 24 and is configured to generate mechanical energy from current associated with the current generated by the first assembly 12.

In accordance with embodiments, the first and second sidewalls 22 and 24 may each be substantially cylindrical and, in some cases, substantially concentric with one another. The first and second assemblies 12 and 13 may also be substantially concentric with one another although portions of the second assembly 13 may be axially displaced from the corresponding portions of the first assembly 12. For example, where the second sidewall 24 is fixed to the first face 20, an end of the second assembly 13 corresponding to the second face 21 protrudes axially from a corresponding end of the first assembly 12.

With the arrangements described above, the first and second assemblies 12 and 13 may each include rotor-stator assemblies. For example, the first assembly 12 may include a generator stator 30, which is fixedly connected to the second sidewall 24, and an externally driven generator rotor 31 that is operably disposed within a central region defined by the generator stator 30. Rotation of the generator rotor 31 induces a current in the generator stator 30. Where the apparatus 10 is installed in a vehicle, the apparatus 10 may further include a drive power generation device 40, such as an engine, to drive the rotation of the generator rotor 31 by way of a drive power generation device shaft 41. In accordance with further embodiments, it is to be understood that the first and second assemblies 12 and 13 may each include various stages of, for example, rotor-stator assemblies and, in this way, provide for additional driving power and/or step-wise increases in driving power equivalent to gear-shifting.

The second assembly 13 may include a drive stator 50, which is fixedly connected to the first sidewall 22, and a drive rotor 51. The drive rotor 51 is operably disposed within a central region defined by the drive stator 50. As such, current applied to the drive stator 50 induces rotation of the drive rotor 51. The rotation of the drive rotor 51 drives external mechanical elements 60, such as drivable devices requiring speed/torque modulation or wheels where the apparatus 10 is installed in a vehicle, via drive shaft 61. The current applied to the drive stator 50 may be the current associated with the current generated by the first assembly 12.

As shown in FIG. 3, the apparatus 10 further includes a first inverter 70 and a second inverter 71. The first inverter 70 is electrically coupled to the first assembly 12 and converts alternating current (AC), which is generated by the first assembly 12, as described above, into direct current (DC). The second inverter 71 is electrically interposed between the first inverter 70 and the second assembly 13 and converts the direct current produced by the first inverter 70 back to alternating current that can be used to drive operations of the second assembly 13. In accordance with further embodiments, control provided by the first and second inverters 70, 71 can affect either or both of the magnitude and frequency of the currents (AC or DC).

That is, in the example given above, as the drive power generation device 40 causes the drive power generation device shaft 41 to rotate, the rotation of the drive power generation device shaft 41 drives rotation of the generator rotor 31. The rotation of the generator rotor 31 induces an alternating current in the generator stator 30. With the first inverter 70 electrically coupled to the generator stator 30, this alternating current is converted into direct current, which is converted back to alternating current by the second inverter 71. With the drive stator 50 electrically coupled to the second inverter 71, this alternating current is applied to the drive stator 50 to cause the rotation of the drive rotor 51. Mechanical energy of the rotation of the drive rotor 51 is then transferred to the mechanical elements 60 via the drive shaft 61.

Figure 4:
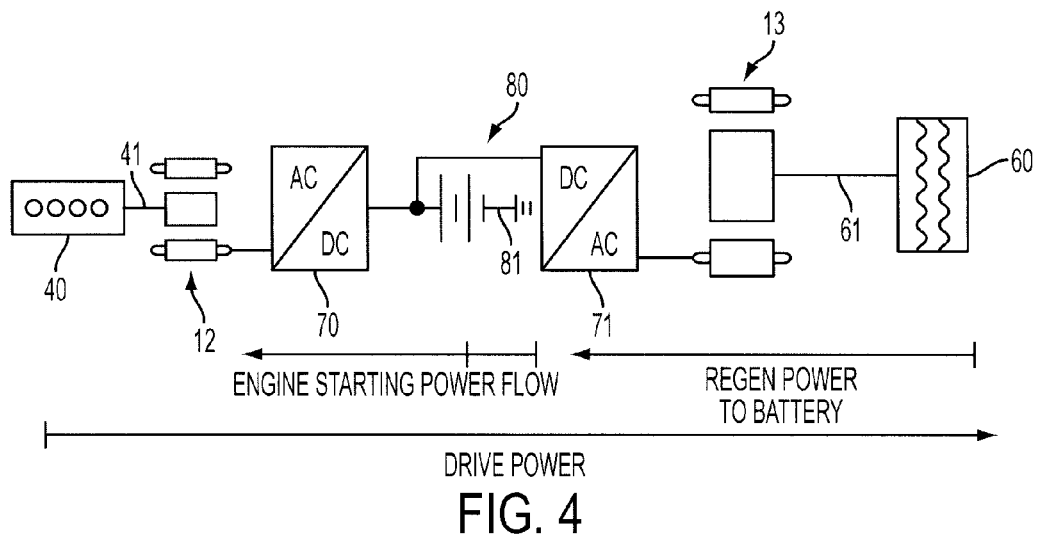
FIG. 4 is a schematic circuit diagram of further embodiments of the concentric motor power generation and drive system apparatus.

In accordance with further embodiments and, with reference to FIG. 4, the apparatus 10 may further include an energy capture circuit 80. The energy capture circuit 80 is electrically interposed between the first and second assemblies 12 and 13 and is configured to capture electrical energy from the current generated in at least the first assembly 12. The energy capture circuit 80 includes the first inverter 70, as described above, the second inverter 71, as described above, and a storage device 81, such as a battery or an ultra capacitor. The storage device 81 is disposed in series with the first and second inverter 71 to store electrical energy derived from output of the first inverter 70 or the second inverter 71 depending on which direction the first and second inverters 70, 71 are commanded. Thus, one inverter can be employed for charging the storage device 81 while the other is employed for driving power or both may be employed for charging or driving.

During normal operations, drive power flows from the drive power generation device 40, through the first assembly 12, the first and second inverters 70, 71, the energy capture circuit 80 and the second assembly 13 and to the mechanical elements 60. During drive power generation device startup, however, a polarity of the first inverter 70 can be reversed in accordance with known methods such that drive power can flow from the storage device 81 to the drive power generation device 40. In this case, electricity stored in the storage device 81 is transmitted to the first inverter 70 where it is converted from direct current to alternating current. The alternating current is then transmitted to the generator stator 30 to cause the generator rotor 31 to rotate. The rotation of the generator rotor 31 causes or assists with the startup of the drive power generation device 40. In addition, during certain driving conditions, such as downhill driving, the storage device can be receptive of power from the second assembly 13. In this case, a polarity of the second inverter 71 can be reversed and mechanical energy of the mechanical elements 61 can be converted into alternating current by the second assembly and then converted into direct current by the second inverter 71. This direct current can be input to the storage device 81.

Figure 5:
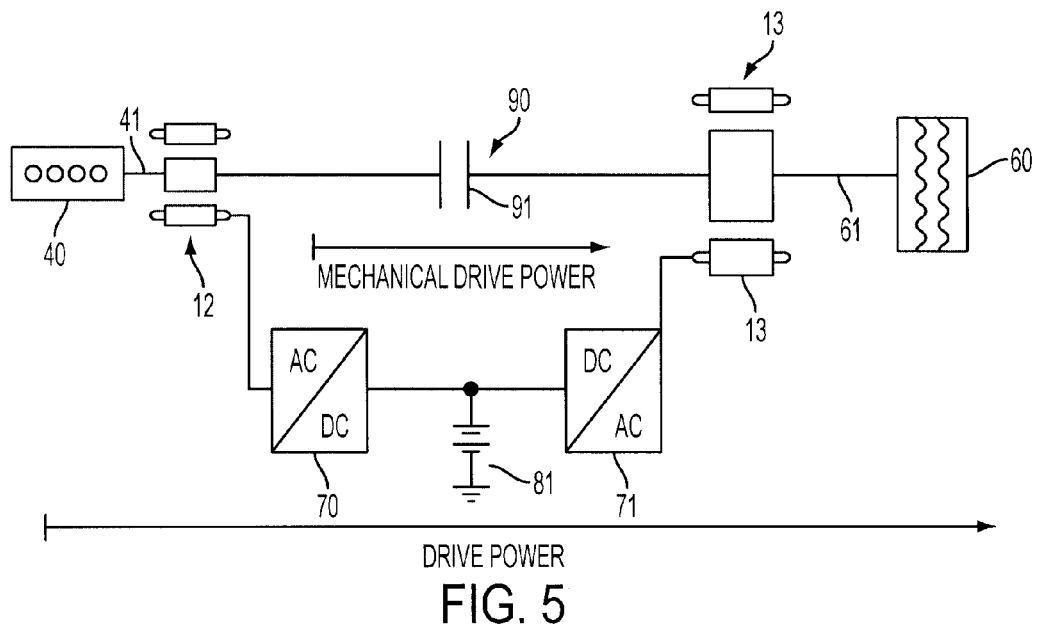
FIG. 5 is a schematic circuit diagram of further embodiments of the concentric motor power generation and drive system apparatus.

In accordance with still further embodiments and, with reference to FIG. 5, the apparatus 10 may further include the energy capture circuit 80, as described above with reference to FIG. 4, such that charging of the storage device 81 is possible, and a coupling 90. The coupling 90 mechanically couples the first and second assemblies 12 and 13 such that at least a portion of the input mechanical energy is transferred from the first assembly 12 to the second assembly 13. To this end, the coupling 90 may include a clutch 91 that is respectively coupled to the first and second assemblies 12 and 13. In these further embodiments, during relatively high-speed travel, the ability to transfer drive power from the first assembly 12 and directly to the second assembly 13 increases an efficiency of the apparatus 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus, comprising:
a hub, including first and second opposing faces, a first sidewall fixed at opposite ends thereof to the first and second opposing faces to define a first interior between the first and second opposing faces and a second sidewall fixed to one of the first and second opposing faces to define a second interior within the first interior;
a first assembly, disposed within the second interior, to generate current from input mechanical energy;
a second assembly, electrically coupled to the first assembly and disposed within the first interior such that the first and second assemblies are disposed in radial alignment but not in axial alignment, to generate mechanical energy from current associated with the current generated by the first assembly; and a coupling to mechanically couple the first and second assemblies such that the input mechanical energy is transferred from the first assembly to the second assembly.

2. The apparatus according to claim 1, wherein the first and second sidewalls are each substantially cylindrical.

3. The apparatus according to claim 1, wherein the first and second sidewalls are substantially concentric.

4. The apparatus according to claim 3, wherein the first and second assemblies are substantially concentric.

5. The apparatus according to claim 1, wherein the first and second assemblies each comprise rotor-stator assemblies.

6. The apparatus according to claim 1, wherein the first assembly comprises:
a generator stator fixed to the second sidewall; and
an externally driven generator rotor operably disposed within the generator stator such that generator rotor rotation induces a current in the generator stator.

7. The apparatus according to claim 6, further comprising a drive power generation device to drive the generator rotor rotation.

8. The apparatus according to claim 1, wherein the second assembly comprises:
a drive stator fixed to the first sidewall; and
a drive rotor to drive external mechanical elements, the drive rotor being operably disposed within the drive stator such that current applied to the drive stator induces rotation of the drive rotor.

9. The apparatus according to claim 8, wherein the current associated with the current generated by the first assembly is applied to the drive stator.

10. The apparatus according to claim 8, wherein the external mechanical elements comprise drivable devices requiring speed/torque modulation.

11. The apparatus according to claim 1, further comprising:
a first inverter, electrically coupled to the first assembly, to convert alternating current generated by the first assembly to direct current; and
a second inverter, electrically interposed between the first inverter and the second assembly, to convert the direct current to alternating current.

12. The apparatus according to claim 1, wherein the coupling comprises a clutch respectively coupled to the first and second assemblies.

13. The apparatus according to claim 1, further comprising:
a drive power generation device to provide drive power as the input mechanical energy;
drivable devices requiring speed/torque modulation driven by the mechanical energy generated by the second assembly, wherein
the drive power is transferred from the first assembly to the second assembly by the coupling.

14. An apparatus, comprising:
a hub, including first and second opposing faces, a first sidewall fixed at opposite ends thereof to the first and second opposing faces to define a first interior between the first and second opposing faces and a second sidewall fixed to one of the first and second opposing faces to define a second interior within the first interior;
a first assembly, disposed within the second interior, to generate current from input mechanical energy;
a second assembly, electrically coupled to the first assembly and disposed within the first interior such that the first and second assemblies are disposed in radial alignment but not in axial alignment, to generate mechanical energy from current associated with the current generated by the first assembly;
a coupling to mechanically couple the first and second assemblies such that the input mechanical energy is transferred from the first assembly to the second assembly; and
an energy capture circuit, electrically interposed between the first and second assemblies, to capture electrical energy from the generated current.

15. The apparatus according to claim 14, wherein the energy capture circuit comprises:
a first inverter, electrically coupled to the first assembly, to convert alternating current generated by the first assembly to direct current;
a second inverter, electrically interposed between the first inverter and the second assembly, to convert the direct current to alternating current; and
a storage device disposed in parallel with the second inverter to store electrical energy derived from output of the first inverter.

16. The apparatus according to claim 15, wherein the storage device comprises a battery.

17. The apparatus according to claim 16, wherein the battery is configured to enable a drive power generation device startup and to supply back drive power.

18. The apparatus according to claim 16, wherein the battery is receptive of power from the second assembly during predefined conditions.

19. An apparatus, comprising:
a hub, including first and second opposing faces, a first sidewall fixed at opposite ends thereof to the first and second opposing faces to define a first interior between the first and second opposing faces and a second sidewall displaced from the first sidewall and fixed to one of the first and second opposing faces to define a second interior within the first interior;
a first assembly, partially supported on and directly attached to an interior facing surface of the second sidewall and disposed within the second interior, to generate current from input mechanical energy;
a second assembly, electrically coupled to the first assembly and partially supported on and directly attached to an interior facing surface of the first sidewall, the second assembly being disposed within the first interior to partially surround the first assembly in a radial dimension of the first assembly and configured to generate mechanical energy from current associated with the current generated by the first assembly; and
a coupling to mechanically couple the first and second assemblies such that the input mechanical energy is transferred from the first assembly to the second assembly.

20. The apparatus according to claim 19, further comprises an energy capture circuit, electrically interposed between the first and second assemblies, to capture electrical energy from the generated current.

* * * * *